United States Patent [19]

Clark

[11] E Patent Number: Re. 32,860

[45] Reissued Date of Patent: Feb. 7, 1989

[54] SOLENOID CONSTRUCTION AND METHOD FOR MAKING THE SAME

[75] Inventor: Bruce D. Clark, Clifton Springs, N.Y.

[73] Assignee: G. W. Lisk Company, Inc., Clifton Springs, N.Y.

[21] Appl. No.: 140,661

[22] Filed: Jan. 4, 1988

Related U.S. Patent Documents

Reissue of:

[64] Patent No.: 4,604,600
Issued: Aug. 5, 1986
Appl. No.: 740,640
Filed: Jun. 3, 1985

U.S. Applications:

[63] Continuation-in-part of Ser. No. 563,891, Dec. 23, 1983, Pat. No. 4,539,542.

[51] Int. Cl.[4] ..... H01F 7/08

[52] U.S. Cl. ..... 335/261; 335/279; 335/281

[58] Field of Search ..... 335/251, 255, 257, 258, 335/261, 262, 268, 279, 281

[56] References Cited

U.S. PATENT DOCUMENTS

| | | | |
|---|---|---|---|
| 3,168,242 | 2/1965 | Diener | 335/261 X |
| 3,510,814 | 5/1970 | Nordfors | 335/262 |
| 3,633,139 | 1/1972 | Thompson | 335/255 |
| 3,735,302 | 5/1973 | Eckert | 335/262 |
| 3,870,931 | 3/1975 | Myers | 335/268 X |
| 3,900,822 | 8/1975 | Hardwick et al. | 335/268 |
| 3,987,385 | 10/1976 | Diller et al. | 335/261 |
| 4,282,501 | 8/1981 | Myers | 335/258 |

FOREIGN PATENT DOCUMENTS

| | | | |
|---|---|---|---|
| 1219571 | 6/1966 | Fed. Rep. of Germany | 335/261 |

OTHER PUBLICATIONS

"Cove Tube & Parts", No. 819,714, 7/82, Vickers, Inc., Troy, Michigan, Copy in 335/261.

*Primary Examiner*—George Harris
*Attorney, Agent, or Firm*—Stonebraker, Shepard & Stephens

[57] ABSTRACT

A proportional solenoid has a fixed pole piece 39 and a movable armature 45, both fitted into the bore 52 of a guide tube 36 that provides the required concentricity between the fixed and movable pole pieces 39 and 45. One of the pole pieces has a cylindrical recess 56 and the other pole piece has a reduced diameter cylindrical nose 62 that is complementary to cylindrical recess 56. A radially inwardly facing frusto-conical surface 95 is formed in cylindrical nose 62 to be disposed within recess 56 of the other pole piece and provide a frusto-conical pole piece section producing a linear forces-stroke curve.

33 Claims, 2 Drawing Sheets

SOLENOID CONSTRUCTION AND METHOD FOR MAKING THE SAME

Matter enclosed in heavy brackets [ ] appears in the original patent but forms no part of this reissue specification; matter printed in italics indicates the additions made by reissue.

RELATED APPLICATIONS

This is a continuation-in-part companion application to my parent application Ser. No. 563,891, filed Dec. 23, 1983, now U.S. Pat. No. 4,539,542 entitled SOLENOID CONSTRUCTION AND METHOD FOR MAKING THE SAME. A patent on this application will expire at the same time as a patent on my parent application.

BACKGROUND

1. Field of the Invention

This invention relates to solenoids and methods for making the same and particularly proportional type solenoids.

2. Description of the Prior Art

General purpose solenoids provide a force-stroke curve whereby the force at a closed stroke gap is higher than the force developed at the initial starting stroke gap. These solenoids are sometimes referred to as "on-off" solenoids and are energized ("on") to a fully operated position or are de-energized ("off") to a fully neutral position. In this type of solenoid, in order to activate the armature to close the stroke gap, the solenoid must only provide enough force to overcome the load including any frictional or side-loading magnetic forces perpendicular to the axis of motion.

Proportional solenoids have long been known in the art to provide a force vs. stroke curve that allows the output force of the solenoid to be proportional to the electrical current applied to the coil. This proportionality of the output force permits such a solenoid to either fully or partially operate a load by selectively applying either the full or a partial electrical current to the solenoid coil and thereby may selectively position the armature along the linear distance of the gap.

In order to operate this type of solenoid accurately, the forces in the solenoid must be accurately controlled. Since the frictional and side loading forces vary depending upon a number of factors that cannot be accurately controlled, including tolerances in manufacturing and the equipment being operated by the solenoid, desirably their effects should be minimized in the design of the solenoid.

The prior art history of proportional solenoids and problems of such solenoids are described in U.S. Pat. No. 3,900,822, Column 1 (Hardwick).

The prior art proportional solenoid provided multiple complex bearing surfaces including a bearing between the armature rod and the stationary pole piece. For example, see the complex bearing and structural support for the armature in each of the prior art patents, German Pat. No. 1,270,178 and U.S. Pat. Nos. 3,870,931 and 3,970,981, in order to provide the necessary structure for a proportional solenoid and to provide concentricity of the armature. Such constructions required very fine manufacturing tolerances, and it was difficult assembling such solenoids.

In order to overcome the concentricity problems of the above prior art patents and provide a concentricity tube for maintaining concentricity of both the armature and fixed pole piece, a multiple section armature tube 10 as shown in FIG. 1 of the drawings was invented. This multiple section tube 10 included a magnetic section 12 made of ferromagnetic material having an external frusto-conical surface 14. The next section of the tube is a non-magnetic brass ring 16 brazed or otherwise permanently fixed at the surface 14 to section 12 and is brazed or permanently fixed along an opposite frusto-conical surface 18 to a third section 20 made of ferromagnetic material. Thus, the non-magnetic brass ring middle section 16 provides the essential non-magnetic radial transverse frusto-conical gap, which gap is linearly coextensive with the stroke gap of the armature. The tube 10 is press fitted or otherwise permanently fixed to a stationary or fixed magnetic pole piece 22 made of ferromagnetic material. The composite armature tube 10 and stationary pole piece 22 are received and mounted in a solenoid coil (not shown).

A movable armature 24 made of ferromagnetic material is provided with a pair of spaced non-magnetic bearing surfaces 26 made by bronze bushings, for example. There is a non-magnetic shim 28 surrounding a push rod 30 permanently mounted on armature 24 and slidable in a center hole 32 of the stationary pole piece 22.

The construction of the three-section tube shown in FIG. 1 is similar to the construction shown in U.S. Pat. No. 3,970,981 except that all three sections are brazed or otherwise fixed together to form one continuous multiple section, multiple metal armature tube.

SUMMARY OF THE INVENTION

The present invention includes a hollow solenoid armature tube adapted to be received in a solenoid coil, a stationary pole piece member fixed in one end of the tube, an armature member adapted for axial sliding movement in the tube, one of the members having an axially extending recess therein and the other of the members having a reduced in cross section end portion adapted to be received in and complementary to said recess. The member having the reduced in cross section end portion also has a radially internally facing frusto-conical surface formed within the recess, the tube thereby providing concentricity of the two members, and the tube having a non-magnetic section extending coaxially with the gap made by the stroke of the armature.

The present invention minimizes the concentricity problems with proportional type solenoids with a less complicated structure than prior art solenoids. This is done by containing both the stationary pole piece and the movable armature within the same cylindrical surface of a single metal armature guide tube.

The present invention pertains to proportional type solenoids. It is an object of this invention to provide an improved solenoid construction overcoming the problems of the prior art as described above.

It is an important object of this invention to reduce the effects of magnetic side loading with similar structure than the prior art. This is done by controlling the concentricity between a reduced diameter cylindrical nose of the movable armature and the mating cylindrical recess in a stationary pole piece. Concentricity is maintained because both the movable armature and the stationary pole piece are confined by the bore of a one-piece metal guide tube.

It is further an object of this invention to minimize magnetic side loading by providing a non-magnetic space between most of the linear dimensions of the armature and the adjacent magnetic members, which can be provided by at least several alternatives such as a uniform non-magnetic bearing surface or simply making the entire guide tube non-magnetic.

DETAILED DESCRIPTION

Figure 2:
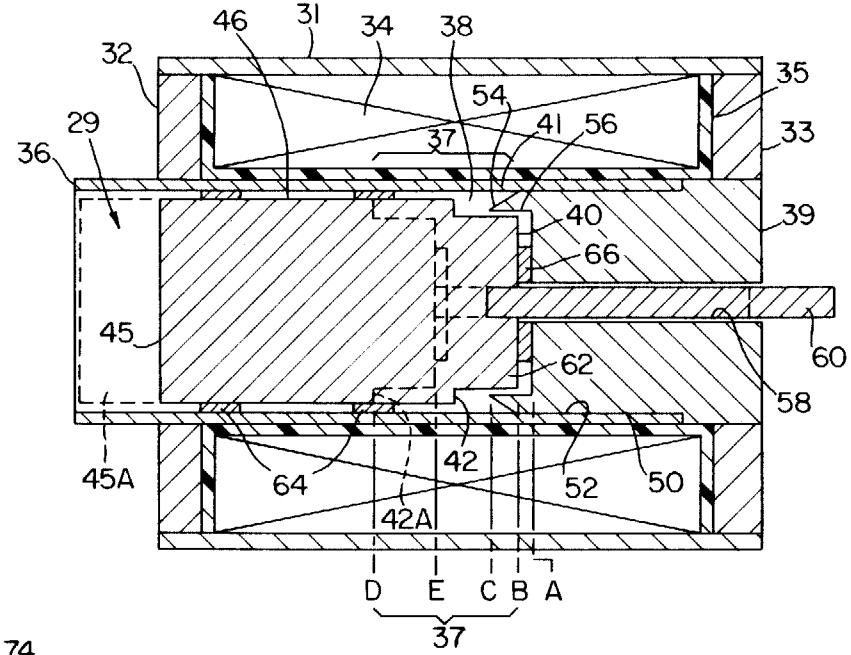
FIG. 2 is a cross-sectional view of one embodiment of the present invention wtih a solenoid coil and housing added.

The preferred embodiment of the invention illustrated in FIG. 2 is a general purpose proportional solenoid. The construction of the present invention is readily adaptable to proportional solenoids requiring a pressure tight bore such as those solenoids used in hydraulic applications. Also, this invention is readily adaptable to push-pull solenoids. The illustrated embodiment includes an outer housing 31 made of ferromagnetic material. An end washer 32 and an end washer 33 made of ferromagnetic material are press fitted into the housing 31. The housing 31 and end washers 32 and 33 encase an electrical winding or coil 34 that is wound on a coil form (bobbin) 35.

A concentricity guide tube or hollow solenoid armature tube 36 is preferably a one-piece metal tube made of magnetic stainless steel material, defining a cylindrical armature chamber 29 adapted to receive an armature 45 made of ferromagnetic material. The armature 45 is adapted to slide axially in the armature chamber 29. The armature tube 36 has a cylindrical non-magnetic middle section 37 (described more in detail hereinafter).

In the embodiments of FIGS. 2–3 and 5–8, the armature tube 36 is preferably made of semiaustenitic steel (as described more in U.S. Pat. No. 3,633,139), such as that known as 17-7P.H. (precipitation hardening) stainless steel. The non-magnetic (austenitic) section 37 provides hindrance to that portion of the magnetic field trying to pass through the non-magnetic section 37 of the armature tube 36, thereby providing a gap which is reduced in magnetic force described more in detail hereinafter. The remainder of the armature tube 36 on both sides of the non-magnetic section 37 is magnetic (martensitic) in order to minimize hindrance of the magnetic field passing radially therethrough. Or, the armature tube 36 may be entirely non-magnetic, when the armature tube wall thickness is thin enough to keep the magnetic losses sufficiently small to allow the solenoid to operate with the desired efficiency.

Although from a manufacturing point of view it would be more expensive and therefore less desirable, it would be possible within the concept of this invention to provide a welded or brazed together multiple section tube having at least one non-magnetic section extending axially along the desired gap, which is reduced in magnetic force, in lieu of the one-piece tube 36, and still fulfill the concept and functions of this invention.

There is a stationary pole piece 39 fixed in one end of the armature tube 36 thereby defining one end of the armature chamber 29. In the embodiment of FIG. 2, stationary pole piece 39 has a radially externally facing frusto-conical section 41 having a radially externally facing frusto-conical surface 54 that is annular and concentric to the center axis of the tube and that surrounds an axial cylindrical concentric recess 56 (that is also concentric to the tube axis) of the stationary pole piece 39. Stationary pole piece 39 has a center bore 58 adapted to receive a non-magnetic push rod 60 permanently mounted on the armature 45. Bore 58 and push rod 60 are not necessary if the solenoid is designed for pulling, rather than pushing. The stationary pole piece 39 is made of ferromagnetic material and has a linear section with a reduced outside diameter 50 which is press fitted into a bore 52 of the armature tube 36.

Thus, both the stationary pole piece 39 and the movable armature 45 are maintained in concentricity by the armature tube 36. The armature 45 is shown in FIG. 2 in solid line in its energized position and is shown in FIG. 2 in broken line at 45A in its de-energized or "neutral" position.

The non-magnetic section 37 of the armature tube 36 surrounds an air gap 38. The armature 45 has a reduced in cross section axial cylindrical concentric end portion or nose 62 surrounded by a shoulder 42. The reduced in cross section portion 62 is received in and complementary to the cylindrical recess 56 of the stationary pole piece 39. The shoulder 42 of movable armature 45 (as illustrated in the retracted position at 42A and as shown in broken line on the armature in the retracted broken line position 45A) defines the air gap 38 which extends axially to the radially externally facing frusto-conical section 41 of the stationary pole piece 39.

The non-magnetic section 37 and air gap 38 in the FIG. 2 illustrated embodiment each extend coaxially from an internal radial end surface 40 of armature 45 represented by the line B to the line D (of FIG. 2), which is the shoulder 42A when the armature 45 is in its de-energized broken line position. In this embodiment, the non-magnetic section 37 and air gap 38 exceed the full stroke of the armature illustrated in FIG. 2, which full stroke is between the lines B and E and includes a "working stroke" between the lines B to C of FIG. 2 and an "overtravel" stroke between the lines C and E of FIG. 2. The force characteristics of each of these strokes are described hereinafter with reference to FIG. 4 which illustrates these force characteristics.

Figure 4:
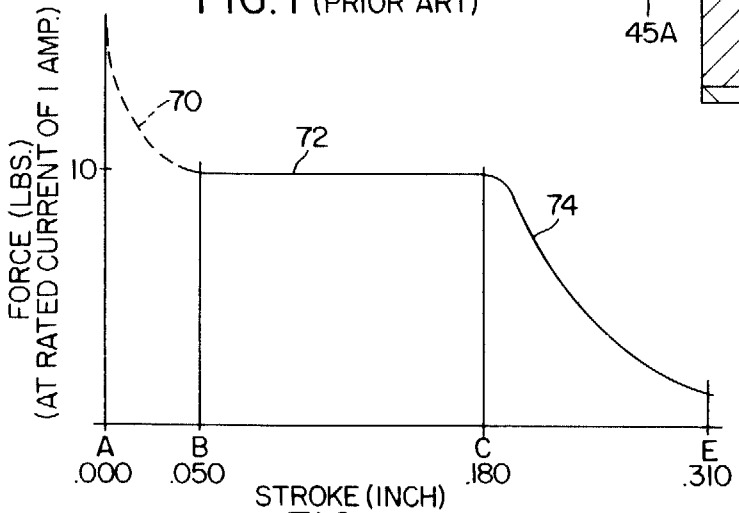
FIG. 4 is a graph showing the force-stroke performance of the solenoid provided by the present invention.

Thus, the non-magnetic section 37 of the tube provides a gap which is reduced in magnetic force, shown in FIG. 2 between the lines B to D (hereinafter referred to as reduced magnetic gap) illustrated so that in the present embodiment the reduced magnetic gap is coaxially the same as the air gap 38, thereby also extending between the lines B and D of FIG. 2; thus is provided a reduced magnetic gap coaxially longer than the full stroke of the armature which extends only between the lines B and E of FIG. 2. It will be understood by one skilled in the art that the coaxial distance of the non-magnetic section 37 can be selectively varied in order to permit the desired selected magnetic forces to be produced on the armature 45 in order to get the resulting desired selected proportional forces output and forces curve. One such desired curve is shown in FiG. 4; other curves can be obtained as desired. As already described, the armature tube 36 may be constructed of completely non-magnetic material such as non-magnetic stainless steel. What is important is that the non-magnetic section 37 of the armature tube 36 extends coaxially at least a selected portion of the armature stroke sufficient to permit selected magnetic forces to be produced on the armature 45 to get the desired selected proportional forces output and curve.

An external cylindrical surface 46 of the armature 45 is provided with a pair of cylindrical spaced uniform non-magnetic bearing surfaces 64 made by electroless nickel plating. Thus, a uniform non-magnetic space is provided between the armature 45 and the armature tube 36, which minimizes the effects of frictional and side-loading forces. A non-magnetic brass shim 66 is provided to eliminate the portion of the stroke which yields undesirable rising force characteristics as illustrated by that portion of the curve on the FIG. 4 graph between the lines A to B.

The graph illustrated in FIG. 4 shows a typical force vs. stroke curve for the FIG. 2 solenoid which has a 20 ohm coil with a size of 1.75 inch outside diameter, 2 inches long, and an 0.88 inch diameter bore. The forces shown by the solid line 74 between the lines E and C (FIG. 4) are termed "overtravel" stroke and are used when additional stroke gap is required beyond the "working" stroke gap C-B. The additional stroke gap may be required for some other use, for example on a double-solenoid hydraulic valve. The force shown by solid line 72 between the lines C and B of FIG. 4 shows a substantially constant force characteristic which illustrates the force during the solenoid "working" stroke as the armature 45 moves from the partially energized "C" position of FIG. 2 toward the fully energized (solid line) "B" position of FIG. 2. The broken line force, shown by the curve or line 70 between lines B and A (FIG. 4) is generally undesirable and is eliminated as described above by inserting the shim 66.

Figure 3:
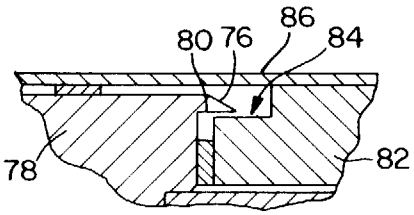
FIG. 3 is a cross-sectional view of a portion of a second embodiment of the present invention.
Figure 1:
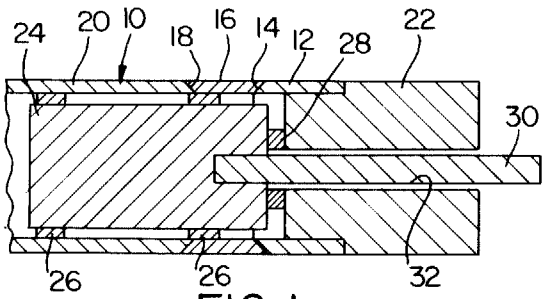
FIG. 1 (PRIOR ART)
FIG. 1 is a cross-sectional view of a prior art solenoid tube and pole pieces.

FIG. 3 illustrates a portion of a second embodiment of this invention in which the relative positions of the radially externally facing frusto-conical surface 54 (FIG. 2) and recess 56 (FIG. 2) of the stationary pole piece 39 are reversed. Thus, a radially externally facing frusto-conical surface 76 is provided on armature 78 of FIG. 3 and likewise there is a corresponding reversal of the parts by incorporating a reduced in cross section cylindrical end portion or nose 84 corresponding to the nose piece 62 of FIG. 2 on a stationary pole piece 82 of FIG. 3. The radially externally facing frusto-conical surface 76 surrounds an axial cylindrical concentric recess 80 corresponding to the recess 56 of the stationary pole piece 39 in FIG. 2. The armature 78 and the stationary pole piece 82 are maintained in concentricity by an armature tube 86. The rest of the structure of the FIG. 3 embodiment is the same as in the FIG. 2 embodiment.

Fixed and movable pole pieces arranged within an armature tube to have a complementary recess and reduced in cross section end portion disposed within the recess offer possibilities for frusto-conical pole piece sections other than the externally facing frusto-conical surfaces surrounding a pole piece of recess as explained above relative to FIGS. 2 and 3. These other frusto-conical pole piece sections were envisioned as possibilities when my parent application was filed and have now been confirmed by experimentation to be practical. My preferred embodiments of these alternatives are shown in FIGS. 5–8.

All these alternatives share the basic structure explained above relative to FIGS. 2 and 3, including fixed and movable pole pieces concentrically aligned within armature tube 36 and preferably using the same solenoid components and structure as described in more detail above. These alternatives also share with the embodiments of FIGS. 2 and 3 the basic structure of a recess 56 formed in the end of one pole piece, and a complementary projection or nose 62 formed in the other pole piece to be disposed within the recess 56.

Figure 5:
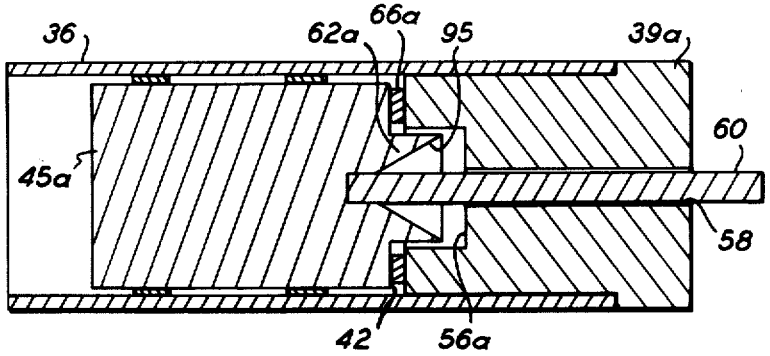
FIGS. 5–8 are fragmentary, cross-sectional views of alternative preferred embodiments of the present invention.
Figure 6:
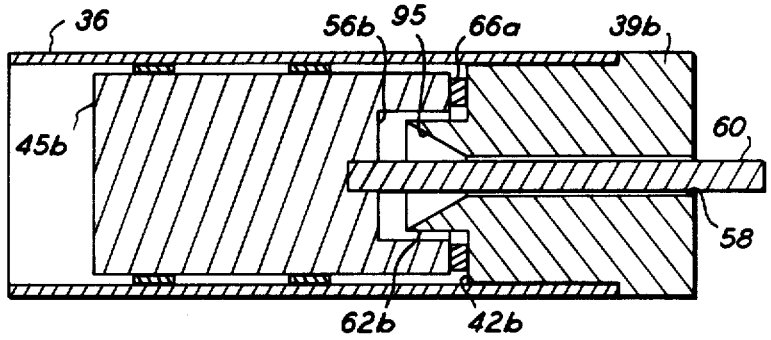

Alternative frusto-conical pole piece sections can then be formed relative to complementary recesses and end projections as shown in FIG. 5 for a conic section formed on movable armature 45a and in FIG. 6 for a conic section formed on fixed pole piece 39b. Instead of having a conic section with a radially externally facing frusto-conical surface surrounding recess 56a of fixed pole piece 39c of FIG. 5 or recess 56b of movable armature 45b of FIG. 6, the reduced in cross section end portion or nose 62a or 62b complementary to recess 56a or 56b is formed with a radially inward facing frusto-conical surface 95 disposed within recess 56a or 56b. This arrangement, like the embodiments shown in FIGS. 2 and 3, can also produce a proportional solenoid with a force-stroke curve having a linear portion such as shown in FIG. 4.

Pole pieces 45a, 39a, 45b, and 39b, are otherwise concentrically aligned within armature tube 36 as previously explained, and the rest of the solenoid structure preferably uses the same components as described in more detail relative to the embodiment of FIG. 2. These include a washer-shaped shim 66a between armature shoulder 42 and fixed pole piece 39a or 39b to limit the approach together of the fixed and movable pole pieces for the same purpose as shim 66 in the embodiment of FIG. 2. Also included are push rod 60 extending through bore 58 in a fixed pole piece, although this is not used for pull-type solenoids.

Figure 7:
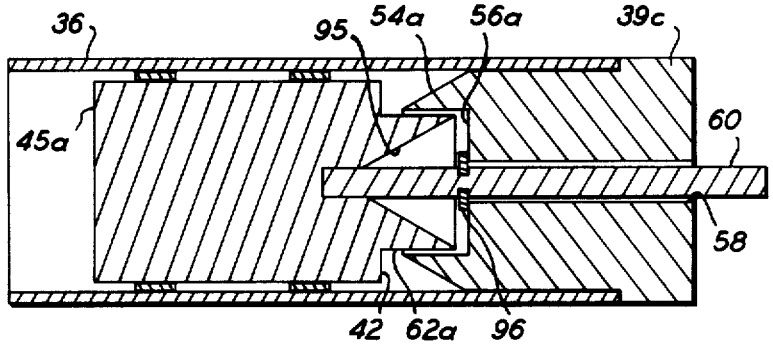
Figure 8:
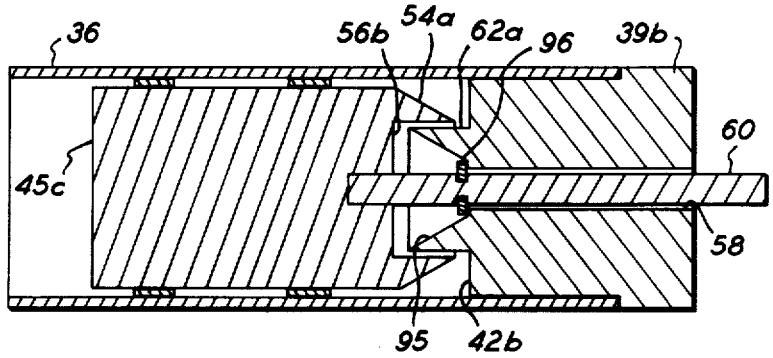

I have discovered further that pairs of opposed and confronting conic sections between fixed and movable pole pieces as shown in FIGS. 7 and 8 can also produce a proportional solenoid. Movable armature 45a of the embodiment of FIG. 7 is similar to the movable armature 45a of the embodiment of FIG. 5, but fixed pole piece 39c has an externally facing frusto-conical surface 54a surrounding recess 56a, similar to frusto-conical surface 54 of the embodiment of FIG. 2. The frusto-conic sections that overlap and move relative to one another between inward facing frusto-conical surface 95 and outward facing frusto-conical surface 54a can produce a force-stroke curve with a linear section as shown in FIG. 4.

A stop device must limit the approach of movable armature 45a toward fixed pole piece 39c; and since there is no room for a conventional shim 66, such as used in the embodiments of FIGS. 2, 3, 5, and 6, I prefer abutment pins or a stop collar 96 secured to push pin 60.

The embodiment of FIG. 8 reverses the configuration of FIG. 7, with recess 56b formed in movable armature 45c and reduced cross section end piece or nose 62a formed in fixed pole piece 39b. This disposes radially inwardly facing frusto-conical surface 95 within recess 56b, which is surrounded by radially outwardly extending frusto-conical surface 54a. The effect is similar to the solenoid of FIG. 7.

The invention has been described in detail above with particular reference to perferred embodiments thereof, but it will be understood that variations and modifications can be effected within the spirit and scope of the invention as described hereinabove and as defined in the appended claims.

I claim:

1. An assembly for use in a solenoid comprising:
a. a hollow solenoid armature tube adapted to be received in a solenoid coil, said tube having an armature chamber therein;
b. a stationary pole piece member fixed in and defining one end of said armature chamber;
c. an armature member positioned in said armature chamber of said tube for axial sliding movement relative to and defining an armature stroke relative to said pole piece member;
d. one of said members having an axially extending recess therein and the other member having a reduced in cross section end portion adapted to be received in and complementary to said recess;
e. said other member having a radially internally facing frusto-conical surface formed on said reduced in cross section end portion and disposed within said recess *to face radially internally into an air gap not entered by said other member;*
f. said armature tube having a non-magnetic section defining a reduced magnetic gap extending coaxially with *said air gap and with* at least a portion of said armature stroke sufficient to permit selected magnetic forces to be produced on said armature; and
g. said armature tube providing concentricity of said two members.

2. An assembly in accordance with claim 1 in which said armature tube comprises a one-piece metal tube.

3. An assembly in accordance with claim 1 including non-magnetic bearing means between said armature member and said armature tube for reducing friction.

4. An assembly in accordance with claim 3 in which said bearing means provides a non-magnetic space between said armature and said armature tube.

5. An assembly in accordance with claim 4 in which said bearing means comprises multiple circumferential bearing surfaces spaced linearly along said armature.

6. An assembly in accordance with claim 1 in which said stationary pole piece member has a reduced in cross section part adapted to be received in and mate with the internal surface of one end of said armature tube.

7. An assembly in accordance with claim 1 in which said armature tube comprises a one-piece semi-austenitic material tube treated to be non-magnetic along said non-magnetic section of said tube.

8. An assembly in accordance with claim 1 in which said armature tube comprises a non-magnetic one-piece tube.

9. An assembly in accordance with claim 1 in which said armature tube comprises a non-magnetic metal one-piece tube.

10. An assembly in accordance with claim 1 wherein said one member has a radially externally facing frusto-conical surface surrounding said recess and extending into said chamber.

11. An assembly for use in a solenoid comprising:
a. a hollow solenoid armature tube adapted to be received in a solenoid coil, said tube having an armature chamber therein;
b. a stationary pole piece member fixed in and defining one end of said armature chamber;
c. an armature member positioned in said armature chamber of said tube for axial sliding movement relative to and defining an armature stroke relative to said pole piece member;
d. one of said members having an axially extending recess therein and the other member having a reduced in cross section end portion adapted to be received in and complementary to said recess;
e. said other member having a radially internally facing frusto-conical surface formed on said reduced in cross section end portion and disposed within said recess *to face radially internally into an air gap not entered by said other member;*
f. said armature tube having a non-magnetic section means providing a reduced magnetic gap extending coaxially with *said air gap and with* at least a portion of said armature stroke sufficient to permit selected magnetic forces to be produced on said armature; and
g. said armature tube providing concentricity of said two members.

12. An assembly in accordance with claim 11 in which said armature tube comprises a one-piece metal tube.

13. An assembly in accordance with claim 11 in which said stationary pole piece member has a reduced in cross section part adapted to be received in and mate with the internal surface of one end of said armature tube.

14. An assembly in accordance with claim 11 in which said armature tube comprises a one-piece semi-austenitic material tube treated to be non-magnetic along said non-magnetic section of said tube.

15. An assembly in accordance with claim 11 in which said armature tube comprises a non-magnetic metal one-piece tube.

16. An assembly in accordance with claim 11 wherein said one member has a radially externally facing frusto-conical surface surrounding said recess and extending into said chamber.

17. An assembly for use in a solenoid comprising:
a. a one-piece cylindrical metal hollow solenoid armature tube adapted to be received in a solenoid coil, said tube having a cylindrical armature chamber therein;
b. a stationary pole piece member fixed in and defining one end of said armature chamber;
c. a cylindrical armature member positioned in said armature chamber of said tube for axial sliding movement defining a stroke gap relative to and defining an armature stroke relative to said pole member;
d. one of said members having an axial concentric cylindrical recess therein and the other cylindrical member having a reduced in cross section axial cylindrical concentric [and] *end* portion adapted to be received in and complementary to said recess;
e. said other member having a radially internally facing frusto-conical surface formed on said reduced in cross section end portion and disposed within said recess *to face radially internally into an air gap not entered by said other member;ep*
f. said armature tube having a non-magnetic section means providing a reduced magnetic gap extending coaxially with *said air gap and with* at least a portion of said armature stroke sufficient to permit selected magnetic forces to be produced on said armature; and
g. said armature tube providing concentricity of said two members.

18. An assembly in accordance with claim 17 including non-magnetic bearing means between said armature member and said armature tube for reducing friction.

19. An assembly in accordance with claim 18 in which said bearing means provides a non-magnetic space between said armature member and said armature tube.

20. An assembly in accordance with claim 19 in which said bearing means comprises surfaces spaced linearly along said armature.

21. An assembly in accordance with claim 17 in which said stationary pole piece member has a reduced in cross section part adapted to be received in and mate with the internal surface of one end of said armature tube.

22. An assembly in accordance with claim 17 in which said armature tube comprises a one-piece semi-austenitic material tube treated to be non-magnetic along said non-magnetic section of said tube.

23. An assembly in accordance with claim 17 including a solenoid coil surrounding said armature tube.

24. An assembly in accordance with claim 17 wherein said one member has a radially externally facing frusto-conical surface surrounding said recess and extending into said chamber.

25. A method of providing an assembly for use in a solenoid comprising the steps of:

a. providing a hollow solenoid armature tube adapted to be received in a solenoid coil, said tube having an armature chamber therein;

b. providing a stationary pole piece member fixed in and defining one end of said armature chamber;

c. providing an armature member positioned in said armature chamber of said tube for axial sliding movement relative to and defining an armature stroke relative to said pole piece member;

d. providing one of said members with a recess therein and the other member with a reduced in cross section end portion adapted to be received in and complementary to said recess;

e. providing said other member with an internally facing frusto-conical surface formed on said reduced in cross section end portion and disposed within said recess *to face radially internally into an air gap not entered by said other member;* f. providing said armature tube with a non-magnetic section defining a reduced magnetic gap extending coaxially with *said air gap and with* at least a portion of said armature stroke sufficient to permit selected magnetic forces to be produced on said armature; and g. said armature tube providing concentricity of said two members.

26. A method in accordance with claim 25 in which said armature tube is provided as a one-piece metal tube.

27. A method in accordance with claim 25 including the step of providing a non-magnetic bearing means between said armature member and said armature tube for reducing friction.

28. A method in accordance with claim 27 in which said bearing means is provided as a non-magnetic space between said armature member and said armature tube.

29. A method in accordance with claim 25 in which said bearing means is provided as multiple circumferential bearing surfaces spaced linearly along said armature.

30. A method in accordance with claim 25 in which said stationary pole piece member is provided with a reduced in cross-section part adapted to be received in and mate with the internal surface of one end of said armature tube.

31. A method in accordance with claim 25 in which said armature tube is provided as a one-piece semi-austenitic material tube treated to be non-magnetic along said non-magnetic section of said tube.

32. A method in accordance with claim 25 including providing a solenoid coil surrounding said armature tube.

33. A method in accordance with claim 25 including providing said one member with an externally facing frusto-conical surface surrounding said recess and extending into said chamber.

* * * * *